United States Patent Office 3,150,118
Patented Sept. 22, 1964

3,150,118
NOVEL MONOMERS, POLYMERS, LACQUERS, AND COATED ARTICLES
David H. Clemens, Willow Grove, Pa., assignor to Rohm & Haas Company, Philadelphia, Pa., a corporation of Delaware
No Drawing. Filed Oct. 12, 1960, Ser. No. 62,161
14 Claims. (Cl. 260—78.5)

This invention relates to novel unsaturated acids which are capable of addition polymerization by virtue of their points of carbon-to-carbon unsaturation. The invention is also concerned with new polymers of these unsaturated acid monomers, and compositions comprising them.

The compounds of the present invention have the formula

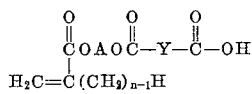
$$H_2C=C(CH_3)_{n-1}H \qquad (I)$$

wherein

A is an alkylene group having 2 to 10 carbon atoms, preferably 2 to 3 carbon atoms, of which at least 2 extend in a chain between the adjoining oxygen atoms, Y is selected from the group consisting of

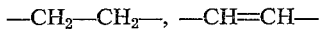

and ortho-phenylene, and $n$ is an integer having a value of 1 to 2.

These compounds include methacryloxyisopropyl acid maleate, methacryloxyethyl acid maleate, methacryloxypropyl acid succinate, methacryloxydecyl acid succinate, metharyloxyoctyl acid phthalate and so on.

These compounds are produced by heating a hydroxyalkyl acrylate or methacrylate with maleic, succinic, or phthalic anhydride in bulk or in an inert solvent, such as benzene, toluene, or xylene, at a temperature of 50° to 130° C. or more. For example, these re-agents may be heated for about 2 to 10 hours at 80° to 100° C. The two reactants may be employed in equimolar ratio or the anhydride may be used in molar excess over the hydroxyalkyl acrylate. Optionally, a tertiary amine or a strong acid catalyst may be used. The tertiary amine may be added in the form of a salt if desired. Examples of tertiary amines include triethylamine, pyridine, and N-methyl-morpholine. The amines used should not contain hydroxyl groups. Examples of acids include sulfuric acid, para-toluenesulfonic acid, hydrochloric acid, and so on. The amount of amine or acid used as the catalyst may amount to ¼ to 2% by weight, based on the weight of the reactants. Also, it is often desirable to use a polymerization inhibitor such as hydroquinone, methyl hydroquinone, etc. to prevent polymerization. When this is used, it may be at a level of from 0.001% to 1%, based on the hydroxyalkyl acrylate or methacrylate. The reaction is such that an equilibrium is attained containing about 25 to 95% by weight of a produce of Formula I hereinabove. The reaction mixture may be washed with water to remove unreacted anhydride and hydroxyalkyl acrylate.

The products of Formula I are water-insoluble, but generally soluble in the inert solvent in which they are produced. They are high-boiling oils that cannot be distilled without decomposition even under a vacuum.

Examples of hydroxyalkyl acrylates or methacrylates that may be used include β-hydroxyethyl acrylate or methacrylate, β-hydroxypropyl acrylate or methacrylate, 3-hydroxypropyl acrylate or methacrylate, 4-hydroxybutyl acrylate or methacrylate, 5-hydroxypentyl acrylate or methacrylate, 6-hydroxyhexyl acrylate or methacrylate, 7-hydroxyheptyl acrylate or methacrylate, 8-hydroxyoctyl acrylate or methacrylate, 9-hydroxynonyl acrylate or methacrylate, and 10-hydroxydecyl acrylate or methacrylate.

The products in the acid form are useful as acid catalysts where mild acid catalysts are appropriate. The salts of these acids with amines or alkali metal hydroxides are useful as buffering agents.

Compounds of Formula I are useful as plasticizers, particularly with nylons of the polyamide type including that known as the 66 nylon, and also for vinyl resins, such as copolymers of vinyl chloride with vinyl acetate. The compounds of Formula I may be introduced into all sorts of formed structures, such as fibers, films, sheets, rods and other shaped structures, formed of various vinyl resins, such as copolymers of vinyl chloride with acrylonitrile or vinyl acetate, homopolymers of vinyl chloride, vinylidene chloride, or acrylonitrile, copolymers of vinylidene chloride with acrylonitrile or vinyl acetate or vinyl chloride, copolymers of acrylonitrile with vinyl acetate, vinyl pyridine, ethylene, isobutylene, and so on, by introducing from 2% to 10% by weight, on the weight of the film-forming polymer, in the melt, solution, or dispersion of the latter before its extrusion, casting, or molding into the final shaped product. The incorporation of the compounds of Formula I in this manner into formed vinyl resin structures serves various purposes including modification of the dyeing, which is particularly important in the production of fibrous materials from polymers of acrylonitrile containing 75% to 95% of the acrylonitrile with other comonomers. Another important purpose served by the introduction of the new compounds into various formed articles made from vinyl resins and especially the polymers of acrylonitrile just mentioned is the increase in moisture retention or moisture regain of the structures and also the reduction of the tendency to develop static electricity during spinning operations as in carding, drawing and twisting, weaving and knitting, and so on. The compounds of Formula I may also be included with glycerine or glycols to provide softening compositions for products, and especially pellicles, films, or sheets formed of regenerated cellulose and hydroxyethyl cellulose to enhance the slip characteristics of the sheets and to reduce blocking tendencies thereof.

As a chemical intermediate, the compounds of the present invention are adapted to react at the double bond with various compounds including alcohols, mercaptans, primary or secondary amines, nitroalkanes, malonates, aceto-acetates, sodium bisulfite, and so on. The addition of long chain amines or mercaptans, such as dodecylamine or mercaptan, provides compounds which are highly useful as water-proofing, softening and lubricating agents for textiles of all types and especially of cellulosic type including rayon and cotton, for leather and for paper.

The compounds of Formula I may be polymerized or copolymerized (with any copolymerizable ethylenically unsaturated compound) in bulk, in solution, or in either an emulsion or suspension technique to produce various types of polymers including the granular type. Solution polymerization may be effected in such solvents as dimethylformamide or other of the solvents mentioned above in which the compounds of Formula I and any comonomers that may be used are suitably soluble. The compounds of Formula I may be copolymerized with water-insoluble monomers by an emulsion technique in which the comonomers are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer is order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds that may be copolymerized with the compound of Formula I include acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene, vinyl toluene, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, tert-butylaminoethyl acrylate or methacrylate, acrylamide, methacrylamide, N-methacrylamide, N-butylmethacrylamide, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, vinylidene chloride, vinyl chloride, methylolacrylamide, $\beta$-hydroxyethyl acrylate, isobutylene, $\alpha$-methylstyrene, p-methylstyrene, p-chlorostyrene, vinylnaphthalene, etc. When copolymerizing a monomer of Formula I derived from succinic anhydride or phthalic anhydride, the proportion of this monomer may amount to anywhere from about ¼% to about 99¾% of the copolymer when any of the monomers mentioned are used. However, when the monomer is derived from maleic anhydride, it should not be used in excess of 10% by weight of the monomer mixture and is preferably not over 5% by weight thereof. Also, in this case, hydrocarbon monomers, such as styrene, etc., which readily polymerize with the double bond of the group Y should not be used at all. Otherwise, gelation occcurs because the compound of Formula I acts as a diethylenically unsaturated co-monomer. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

The homopolymers may be used in admixture with other materials, such as starch, gelatin, or plasticizers therefor to provide coatings or films, thickening materials, warp sizes or the like. The homopolymers with other film-forming materials, such as vinyl and acrylic resins, may be pigmented or dyed to provide decorative coatings on substrates, such as textile, leather, paper, wood, or on metal or glass surfaces.

Copolymers containing from about ¼ to 10% by weight of the compounds of Formula I are particularly valuable in the production of coating materials either in the form of emulsion polymers or solution polymers, the latter being used as lacquers or enamels. The aqueous emulsion dispersions of such copolymers are adapted to be used as water-base paints or to be included in alkaline spinning solutions, such as cuprammonium cellulose or viscose solutions, to modify the dyeing characteristics and the moisture-retention characteristics. Copolymers containing about ½ to 10% of a compound of Formula I with methyl methacrylate or other acrylic acid or methacrylic acid esters or mixtures thereof can be produced in organic solvent solutions such as in xylene and butoxyethyl acetate or mixtures thereof and used as lacquers which are characterized by outstanding adhesion toward a wide variety of substrates including bare and primed metals, such as bare cold rolled steel, aluminum, and brass and other substrates, such as glass, asbestos, cement shingles, leather, wood, paper and textiles.

Copolymers containing from 5 to 10% by weight of a compound of Formula I with ethyl acrylate, butyl acrylate, or the like, are useful to reduce the shrinkage of wool. For this purpose, they may be applied in aqueous dispersions of a concentration from 10% to 30% so that from about 5% to 15% by weight of the copolymer is deposited on the wool fabric. After drying, the treated fabric may be heated to 240° F. to 350° F. for a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. In this connection, the acidic group apparently exerts some chemical bonding action with the structure of the leather so as to provide good adhesion. Copolymers with acrylonitrile, especially those containing from 75% to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75% to 90% acrylonitrile, such as copolymers thereof with vinyl chloride, vinyl acetate or the like, serve to modify the dyeing properties of fibers and films formed therefrom.

In the following examples, which are illustrative of the present invention, parts and percentages are by weight unless otherwise noted.

EXAMPLE 1

(a) β-Methacryloxyisopropyl Acid Maleate

In a glass reaction vessel equipped with a condenser and agitator was placed 784 g. of maleic anhydride, 1152 g. of 2-hydroxypropyl methacrylate, 400 g. of benzene and 0.3 g. of hydroquinone. The temperature was raised to 100° C. in a 30-minute period and maintained at that temperature by means of a thermostatically controlled heater for eight hours. After cooling the liquid product was washed twice with 1 liter quantities of water, dried with anhydrous magnesium sulfate and stripped of volatile materials at room temperature and a pressure of about 1 mm. of mercury. There remained 1669 g. of almost colorless oil having a neutralization equivalent of 269, indicating a purity of about 90%.

(b) β-Acryloxyisopropyl Acid Maleate

This product was obtained as a practically colorless oil by the same procedure except for the substitution of 1040 g. of 2-hydroxypropyl acrylate for the methacrylate.

(c) 6-Methacryloxyhexyl Acid Maleate

This product was obtained as an almost colorless oil by the procedure of part (a) substituting 1487 g. of 6-hydroxyhexyl methacrylate for the 2-hydroxypropyl methacrylate.

(d) β-Methacryloxyethyl Acid Maleate

Part (a) was repeated using 196 g. of maleic anhydride, 260 g. of 2-hydroxyethyl methacrylate, 114 g. of benzene, 0.26 g. of hydroquinone and 3.17 g. of dimethylethanolamine acetate as catalyst. Heating time was 3 hours at 80° C. and the reaction was washed with two 500 ml. portions of water. The yield was 270 g. of almost colorless oil which had a neutralization equivalent of 244, indicating a purity of 93%.

EXAMPLE 2

(a) β-Methacryloxyisopropyl Acid Succinate

Example 1(a) was repeated using 140 g. of succinic anhydride, 197.4 g. of 2-hydroxypropyl methacrylate, 84.1 g. of benzene, 0.197 g. of hydroquinone and 2.46 g. of dimethylaminoethanol acetate. The heating time was four hours at 100° C. The yield was 258 g. of yellow oil which had a neutralization equivalent of 260, indicating a purity of 94%.

(b) 10-Acryloxydecyl Acid Succinate

This product was obtained as a practically colorless oil by the procedure of part (a) using 310 g. of 10-hydroxydecyl acrylate in place of the methacrylate therein used.

(c) β-Acryloxylethyl Acid Succinate

This product was attained as a light-colored oil by the procedure of part (a) using 159 g. of 2-hydroxyethyl acrylate in place of the methacrylate.

(d) 3-Methylacryloxypropyl Acid Succinate

This product was obtained as a light-colored oil by the procedure of part (a) using 197.4 g. of 3-hydroxypropyl methacrylate instead of the 2-hydroxypropyl methacrylate.

EXAMPLE 3

(a) β-Methacryloxyethyl Acid Phthalate

Example 1 was repeated using 296.2 g. of phthalic anhydride, 260.3 g. 2-hydroxyethyl methacrylate, and 0.26 g. of hydroquinone. The heating time was 5 hours at 100° C. The product, 556 g., was an almost colorless oil and had a neutralization equivalent of 334 indicating that the reaction had proceeded 83% to completion.

(b) β-Acryloxyethyl Acid Phthalate

This product was obtained as a practically colorless oil by the procedure of part (a) using 232 g. of 2-hydroxyethyl acrylate instead of the methacrylate.

(c) 4-Acryloxybutyl Acid Phthalate

This product was an almost colorless oil obtained by the procedure of part (a) using 316 g. of 4-hydroxybutyl acrylate instead of the methacrylate.

EXAMPLE 4

A charge comprising 477.4 grams (68.2 percent) of methyl methacrylate, 205.1 grams (29.3 percent) of ethyl acrylate, 17.5 grams (2.5 percent) of methacryloxyisopropyl acid maleate, and 3.5 grams (0.5% of total monomer charge) of benzoyl peroxide is added in the course of two hours to a glass reaction vessel containing 802.5 grams of toluol, and 52.5 grams of 2-methoxy ethanol maintained at 107–109° C. by means of external heating. The mixture in the flask is stirred during the addition and subsequent reaction and maintained at 107–109° C. under a nitrogen atmosphere. Two, four, and six hours after the polymerization has started, the reaction is recatalyzed with 0.7 gram of additional benzoyl peroxide and the temperature maintained at 107–109° C. throughout the entire polymerization. Continued heating for a total of eight hours completes the polymerization cycle. The reaction is then cooled and diluted with 195.0 grams of toluol. The final resin is a clear, viscous solution having a viscosity of about 7 poises at approximately 40% resin solids in a toluol/2-methoxyethanol (95/5 weight ratio) solvent system.

EXAMPLE 5

A charge comprising 477.4 grams (68.2 percent) of methyl methacrylate, 205.1 grams (29.3 percent) of ethyl acrylate, 2.5 grams (0.4 percent) of β-acryloxethyl acid maleate; and 3.5 grams (0.5% of total monomer charge) of benzoyl peroxide is added in the course of two hours to a glass reaction vessel containing 802.5 grams of toluol, and 52.5 grams of 2-methoxy ethanol maintained at 107–109° C. by means of external heating. The mixture in the flask is stirred during the addition and subsequent reaction and maintained at 107–109° C. under a nitrogen atmosphere. Two, four, and six hours after the polymerization has started, the reaction is recatalyzed with 0.7 gram of additional benzoyl peroxide and the temperature maintained at 107–109° C. throughout the entire polymerization. Continued heating for a total of eight hours completes the polymerization cycle. The reaction is then cooled and diluted with 195.0 grams of toluol. The final resin is a clear, viscous solution having a viscosity of about 7 poises at approximately 40% resin solids in a toluol/2-methoxyethanol (95/5 weight ratio) solvent system.

EXAMPLE 6

The procedure of Example 4 hereof is repeated substituting in the initial monomer charge 17.5 grams of methacryloxyethyl acid succinate for the 17.5 grams of methacryloxyisopropyl acid maleate, and 1.75 grams for 3.5 grams of benzoyl peroxide.

EXAMPLE 7

The procedure of Example 4 hereof is repeated substituting in the initial monomer charge 17.5 grams of methacryloxyethyl acid maleate for 17.5 grams of methacryloxyisopropyl acid maleate, and using only 1.75 grams of benzoyl peroxide therein.

EXAMPLE 8

The procedure of example 4 is repeated using a monomer mixture containing 350 grams of methyl methacrylate, 210 grams of ethyl acrylate, 125 grams of styrene and 22 grams of 6-methacryloxyhexyl acid maleate. The resulting copolymer solution formed excellent clear adherent, coatings on bare cold-rolled steel and steel panels primed with a commercial alkyd-epoxide resin primer. Such coatings were dried for ½ hour at 200° F.

EXAMPLE 9

The procedure of Example 4 is repeated using a monomer mixture containing 430 grams of acrylonitrile, 250 grams of n-butyl acrylate, and 25 grams of β-methacryloxethyl acid phthalate. The resulting copolymer solution formed excellent clear adherent, coatings on bare cold-rolled steel and steel panels primed with a commercial alkyd epoxide resin primer. Such coatings were dried for ½ hour at 200 °F. This copolymer solution was particularly valuable as a coating for electrical wires.

EXAMPLE 10

The procedure of Example 4 is repeated using a monomer mixture containing 350 grams of methyl methacrylate, 240 grams of methyl acrylate, 145 grams of vinyltoluene, and 85 grams of 10-acryloxydecyl acid succinate. The resulting copolymer solution formed excellent clear adherent, coatings on bare cold-rolled steel and steel panels primed with a commercial alkyd-epoxide resin primer. Such coatings were dried for ½ hour at 200° F.

EXAMPLE 11

The procedure of Example 4 is repeated using a monomer mixture containing 700 grams of β-acryloxyethyl acid succinate and 10 grams of ethyl acrylate. The resulting acid copolymer was neutralized with a 1% aqueous solution of ammonium hydroxide, diluted to 1% concentration and was useful as a thickener for aqueous disperions of emulsion copolymer systems.

EXAMPLE 12

(a) 200 grams of rutile titanium dioxide and 200 grams of the copolymer solution produced in Example 4 were dispersed with three passes on a 3-roll mill to a fineness of 8 on North Standard guage. To 400 grams of the above paste was added 550 grams of the copolymer solution described in Example 1, giving a pigment-binder weight ratio of 40 to 60 based on non-volatile content. Reduction to spraying viscosity of 15" Ford #4 cup was made with a 3 to 1 blend of xylol and 2-ethoxyethyl acetate. Cold-rolled steel panels, degreased with trichloroethylene vapor were sprayed with the above enamel at spraying viscosity to a dry film thickness of 1.2–1.4 mils. Coated panels were dried for ½ hour at 180° F.

Adhesion was measured with a standard Arco microknife manufactured by Gardner Laboratories. Values given are calculated from microknife determinations and are relative with the higher numbers indicating better adhesion. This coating gave a microknife adhesion value of 25.0 as opposed to a value of 4–6 for a similar resin containing no methacryloxyisopropyl acid maleate.

(b) When an enamel was prepared as in part (a) but using the copolymer of Example 5, coatings on cold-rolled steel prepared and tested in the same way had a microknife adhesion value of 8–12.

EXAMPLE 13

An enamel similar to that in Example 12 was prepared using the copolymer solution described in Example 6 and coated on steel as described in Example 12. The coating gave a microknife adhesion value of 25.0.

EXAMPLE 14

An enamel similar to that in Example 12 was prepared using the copolymer solution described in Example 7, and coated on steel as described in Example 12. The coating gave a microknife adhesion value of 22.4.

I claim:

1. A copolymer of (a) about ¼ to 99¾ % by weight of a compound of the formula

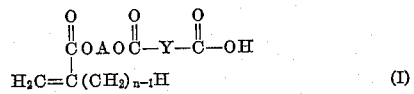

(I)

wherein
 A is an alkylene group having 2 to 10 carbon atoms, of which at least 2 extend in a chain between the adjoining oxygen atoms, Y is selected from the group consisting of —CH₂—CH₂—, —CH=CH—, and o-phenylene, and n is an integer having a value of 1 to 2, and (b) about 99¾% to ¼% by weight respectively of at least one other copolymerizable monoethylenically unsaturated compound with the proviso that when Y is —CH=CH—, the amount of aforesaid part (a) containing the compound in which Y is —CH=CH— does not exceed 10% by weight in the copolymer and the aforesaid part (b) contains no hydrocarbon monomer.

2. A copolymer of about ¼ to 10% by weight of a compound of the formula

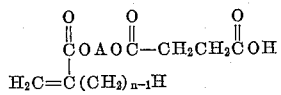

wherein A is an alkylene group having 2 to 10 carbon atoms, of which at least 2 extend in a chain between the adjoining oxygen atoms, and n is an integer having a value of 1 to 2, and about 90 to 99¾ % by weight of at least one other copolymerizable monoethylenically unsaturated compound.

3. A copolymer of about ¼ to 10% by weight of a compound of the formula

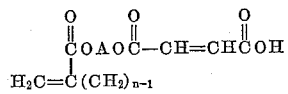

wherein A is an alkylene group having 2 to 10 carbon atoms, of which at least 2 extend in a chain between the adjoining oxygen atoms, and n is an integer having a value of 1 to 2, and about 90 to 99¾% by weight of at least one other copolymerizable monoethylenically unsaturated compound, said copolymer containing no units of a hydrocarbon polymerized therein.

4. A copolymer of about ¼ to 10% by weight of a compound of the formula

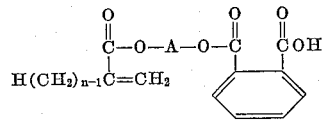

wherein A is an alkylene group having 2 to 10 carbon atoms, of which at least 2 extend in a chain between the adjoining oxygen atoms, and n is an integer having a value of 1 to 2, and about 90 to 99¾ % by weight of at least one other copolymerizable monoethylenically unsaturated compound.

5. A copolymer of about ¼ to 10% by weight of a compound of the formula

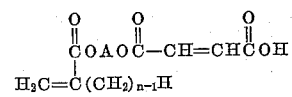

wherein A is an alkylene group having 2 to 10 carbon atoms, of which at least 2 extend in a chain between the adjoining oxygen atoms, and n is an integer having a value of 1 to 2, and about 90 to 99¾% by weight of at least one ester of an acid of the formula

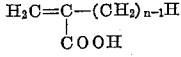

n being as defined, said copolymer containing no units of a hydrocarbon polymerized therein.

6. A copolymer of about ¼% to about 10% by weight of a compound of the formula

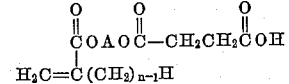

wherein A is an alkylene group having 2 to 10 carbon atoms, of which at least 2 extend in a chain between the adjoining oxygen atoms, and $n$ is an integer having a value of 1 to 2, and about 90 to 99¾% by weight of at least one ester of an acid of the formula

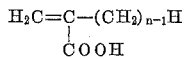

wherein $n$ is as defined herein.

7. A copolymer of about ¼% to about 10% by weight of a compound of the formula

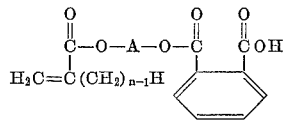

wherein A is an alkylene group having 2 to 10 carbon atoms, of which at least 2 extend in a chain between the adjoining oxygen atoms, and $n$ is an integer having a value of 1 to 2, and about 90 to 99¾% by weight of at least one ester of an acid of the formula

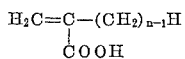

wherein $n$ is as defined herein.

8. A copolymer, formed exclusively of monomers other than hydrocarbon monomers, of about ¼ to 10% by weight of β-methacryloxyisopropyl acid maleate and about 90 to 99¾% by weight of an ester of an acid of the formula

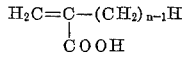

wherein $n$ is an integer having a value of 1 to 2.

9. A copolymer of monoethylenically unsaturated molecules comprising about ¼ to 10% by weight of β-methacryloxyethyl acid succinate and about 90 to 99¾% by weight of an ester of an acid of the formula

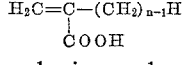

wherein $n$ is an integer having a value of 1 to 2.

10. A copolymer of monoethylenically unsaturated molecules comprising about ¼ to 10% by weight of β-methacryloxyethyl acid phthalate and about 90 to 99¾% by weight of an ester of an acid of the formula

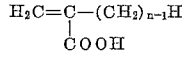

wherein $n$ is an integer having a value of 1 to 2.

11. A copolymer of monoethylenically unsaturated molecules comprising about ¼ to 10% by weight of β-methacryloxyisopropyl acid phthalate and about 90 to 99¾% by weight of an ester of an acid of the formula

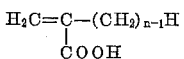

wherein $n$ is an integer having a value of 1 to 2.

12. A copolymer of monoethylenically unsaturated molecules comprising about ¼ to 10% by weight of β-methacryloxyisopropyl acid succinate and about 90 to 99¾% by weight of an ester of an acid of the formula

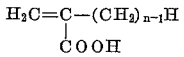

wherein $n$ is an integer having a value of 1 to 2.

13. A copolymer, formed exclusively of monomers other than hydrocarbon monomers, of about ¼ to 10% by weight of β-methacryloxyethyl acid maleate and about 90 to 99¾% by weight of an ester of an acid of the formula

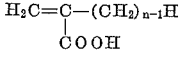

wherein $n$ is an integer having a value of 1 to 2.

14. A copolymer of (a) about ½ to 10% by weight of a compound of the formula

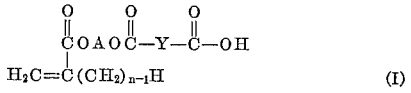  (I)

wherein
A is an alkylene group having 2 to 10 carbon atoms, of which at least 2 extend in a chain between the adjoining oxygen atoms,
Y is selected from the group consisting of $$-CH_2-CH_2-,\ -CH=CH-$$

and o-phenylene, and
$n$ is an integer having a value of 1 to 2,
and (b) about 90 to 99½% by weight of at least one other copolymerizable monoethylenically unsaturated compound with the proviso that when Y is —CH=CH—, the aforesaid part (b) contains no hydrocarbon monomer.

References Cited in the file of this patent
UNITED STATES PATENTS

| 2,384,119 | Muskat et al. | Sept. 4, 1945 |
| 2,681,897 | Frazier et al. | June 22, 1954 |